(12) United States Patent
Tomita

(10) Patent No.: US 9,569,056 B2
(45) Date of Patent: Feb. 14, 2017

(54) TOUCH PANEL

(71) Applicant: FUJITSU COMPONENT LIMITED, Tokyo (JP)

(72) Inventor: Masanari Tomita, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 14/802,177

(22) Filed: Jul. 17, 2015

(65) Prior Publication Data

US 2016/0092008 A1    Mar. 31, 2016

(30) Foreign Application Priority Data

Sep. 26, 2014   (JP) ................................ 2014-197515

(51) Int. Cl.
*G06F 3/047*    (2006.01)
*G06F 3/045*    (2006.01)

(52) U.S. Cl.
CPC .............. *G06F 3/047* (2013.01); *G06F 3/045* (2013.01); *G06F 2203/04103* (2013.01)

(58) Field of Classification Search
CPC  G06F 3/047; G06F 3/045; G06F 2203/04103; G06F 2203/04111; G09G 5/003
See application file for complete search history.

(56) References Cited

U.S. PATENT DOCUMENTS

| | | | |
|---|---|---|---|
| 2011/0212661 A1* | 9/2011 | Lee | G06F 3/044 445/24 |
| 2012/0327023 A1* | 12/2012 | Hashimoto | G06F 3/041 345/174 |
| 2013/0141380 A1* | 6/2013 | Wang | G06F 3/041 345/173 |
| 2014/0293164 A1* | 10/2014 | Kim | G06F 3/0412 349/12 |

FOREIGN PATENT DOCUMENTS

| | | |
|---|---|---|
| JP | 3157059 | 1/2010 |
| JP | 3167028 | 3/2011 |
| JP | 2012-98785 | 5/2012 |
| JP | 2013-8272 | 1/2013 |
| JP | 2014-16857 | 1/2014 |

OTHER PUBLICATIONS

Patent Abstracts of Japan, Publication No. 2014-16857, published Jan. 30, 2014.
Patent Abstracts of Japan, Publication No. 2013-8272, published Jan. 10, 2013.
Patent Abstracts of Japan, Publication No. 2012-98785, published May 24, 2012.

* cited by examiner

*Primary Examiner* — Abbas Abdulselam
(74) *Attorney, Agent, or Firm* — Staas & Halsey LLP

(57) ABSTRACT

A touch panel includes: an upper transparent substrate having an upper transparent electrode film; a lower transparent substrate having a lower transparent electrode film; a first electric wiring formed on the upper transparent elec- (Continued)

trode film; a second electric wiring formed on the lower transparent electrode film; an insulator formed between the first electric wiring and the second electric wiring, the insulator being made of a material with a light shielding effect; and a decoration layer formed on the upper transparent substrate so as to cover the first electric wiring, the second electric wiring and the insulator.

4 Claims, 13 Drawing Sheets

TOUCH PANEL

CROSS-REFERENCE TO RELATED APPLICATION

This application is based upon and claims the benefit of priority of the prior Japanese Patent Application No. 2014-197515 filed on Sep. 26, 2014, the entire contents of which are incorporated herein by reference.

FIELD

A certain aspect of the embodiments is related to a touch panel.

BACKGROUND

There are already many techniques for keeping the flatness of a surface highly even when decoration is added to a touch panel. For example, there is a method for laminating a decoration film on an operation surface.

FIG. 1A is a cross-section diagram of a resistive film type touch panel having no decoration film. FIG. 1B is a cross-section diagram of a resistive film type touch panel having a decoration film.

A resistive film type touch panel 1 of FIG. 1A includes: an upper transparent substrate 11 constituting an operation surface; an upper transparent electrode film 12 bonded to a lower surface of the upper transparent substrate 11; a lower transparent substrate 13 arranged at a lowest position; a lower transparent electrode film 14 bonded to an upper surface of the lower transparent substrate 13; and an electric wiring 15 provided between the upper transparent electrode film 12 and the lower transparent electrode film 14. An air gap 16 is formed between the upper transparent electrode film 12 and the lower transparent electrode film 14. A resistive film type touch panel 1' of FIG. 1B includes a decoration film 17 in addition to the resistive film type touch panel 1 of FIG. 1A. The decoration film 17 is laminated on the upper transparent substrate 11.

In the case of the resistive film type touch panel 1 of FIG. 1A and the resistive film type touch panel 1' of FIG. 1B, the upper transparent electrode film 12 needs to physically touch the lower transparent electrode film 14 to detect a position which a finger or a pen touches. Therefore, a certain degree of a load needs to be applied to the operation surface. Accordingly, in a method of laminating the decoration film 17 on the upper transparent substrate 11, as illustrated in FIG. 1B, the decoration film 17 is also overlapped with an operation area 18. Therefore, there occurs a problem that a load for input in accordance with hardness of the decoration film 17 increases.

To solve the problem, there is a method of providing a decoration layer 17A in the back of the operation surface (i.e., on the lower surface of the upper transparent electrode film 12), as illustrated in FIG. 2A. In this case, since the upper transparent electrode film 12 is not electrically conducted with the electric wiring 15, there occurs a problem that the touch panel does not work.

Therefore, there has been known a configuration in which a part of the electric wiring 15 is connected to the lower surface of the upper transparent electrode film 12 along a side surface of the decoration layer 17A, as illustrated in FIG. 2B (e.g. see Japanese Laid-open Patent Publication No. 2014-16857). Moreover, there has been known a configuration in which the decoration layer 17A is provided between the upper transparent substrate 11 and the upper transparent electrode film 12 (e.g. see Japanese Registered Utility Model No. 3167028).

SUMMARY

According to a first aspect of the present invention, there is provided a touch panel including: an upper transparent substrate having an upper transparent electrode film; a lower transparent substrate having a lower transparent electrode film; a first electric wiring formed on the upper transparent electrode film; a second electric wiring formed on the lower transparent electrode film; an insulator formed between the first electric wiring and the second electric wiring, the insulator being made of a material with a light shielding effect; and a decoration layer formed on the upper transparent substrate so as to cover the first electric wiring, the second electric wiring and the insulator.

According to a second aspect of the present invention, there is provided a touch panel including: an upper transparent substrate having an upper transparent electrode film; a lower transparent substrate having a lower transparent electrode film; a first electric wiring formed on the upper transparent electrode film; a second electric wiring formed on the lower transparent electrode film; an insulating layer formed between the first electric wiring and the second electric wiring; a decoration layer formed on the upper transparent substrate so as to cover the first electric wiring, the second electric wiring and the insulating layer; and a light shielding member provided on a lower surface of the lower transparent substrate so as to overlap with the decoration layer.

According to a third aspect of the present invention, there is provided a touch panel including: an upper transparent substrate having an upper transparent electrode film; a lower transparent substrate having a lower transparent electrode film; a first electric wiring formed on the upper transparent electrode film; a second electric wiring formed on the lower transparent electrode film; an insulating layer formed between the first electric wiring and the second electric wiring; a decoration layer formed on the upper transparent substrate so as to cover the first electric wiring, the second electric wiring and the insulating layer; and a coating material applied on the decoration layer and the upper transparent substrate so as to flatten a surface of the touch panel.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 2A:
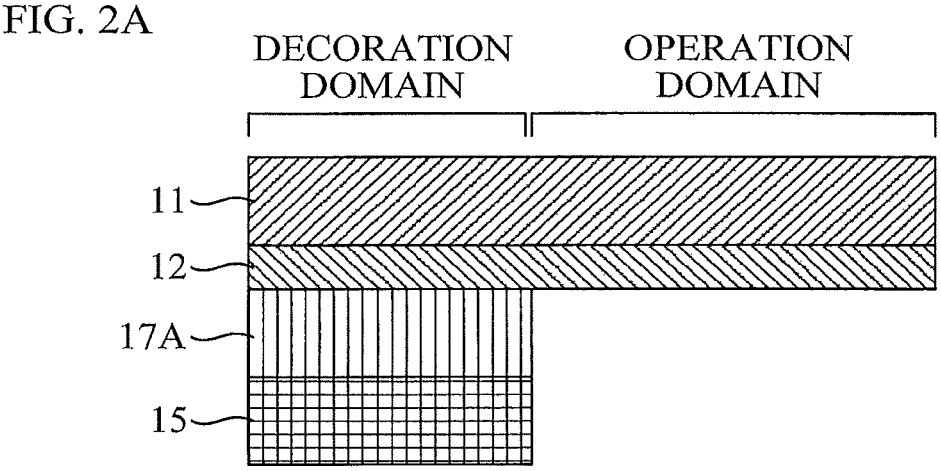
FIGS. 2A to 2C are diagrams illustrating a part of a cross-section surface of a touch panel.
Figure 2B:
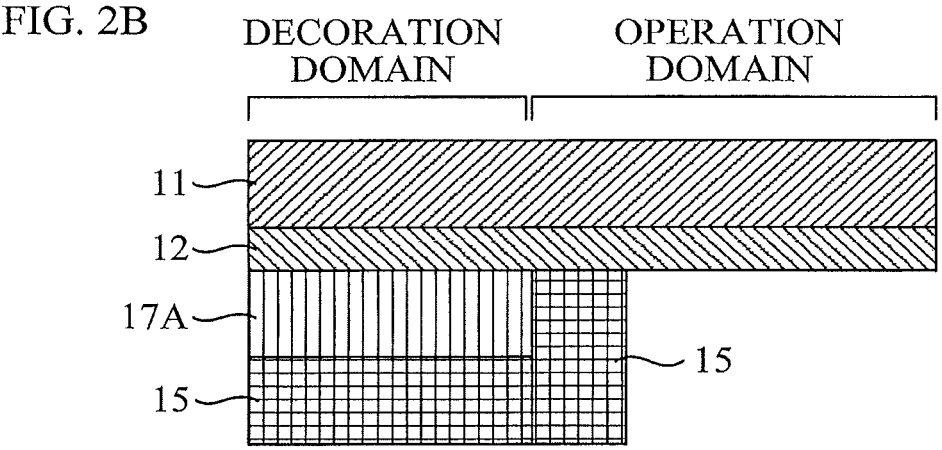
Figure 2C:
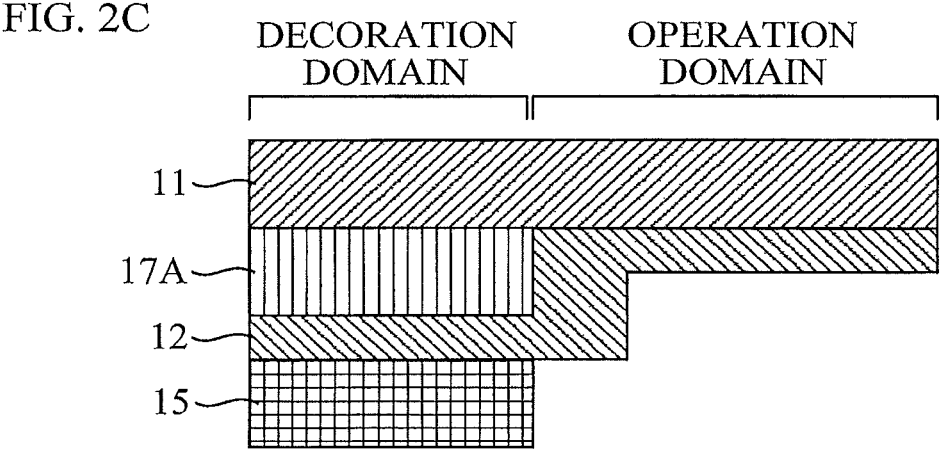

In the configuration of FIG. 2B, there is a problem that a part of the electric wiring 15 protrudes to the transparent operation area and is seen by a user. Moreover, in the configuration of FIG. 2C, there is a problem that the upper transparent electrode film 12 needs to be formed on the decoration layer 17A and hence a manufacturing process is complicated.

A description will now be given of embodiments with reference to the drawings.

First Embodiment

Figure 3:
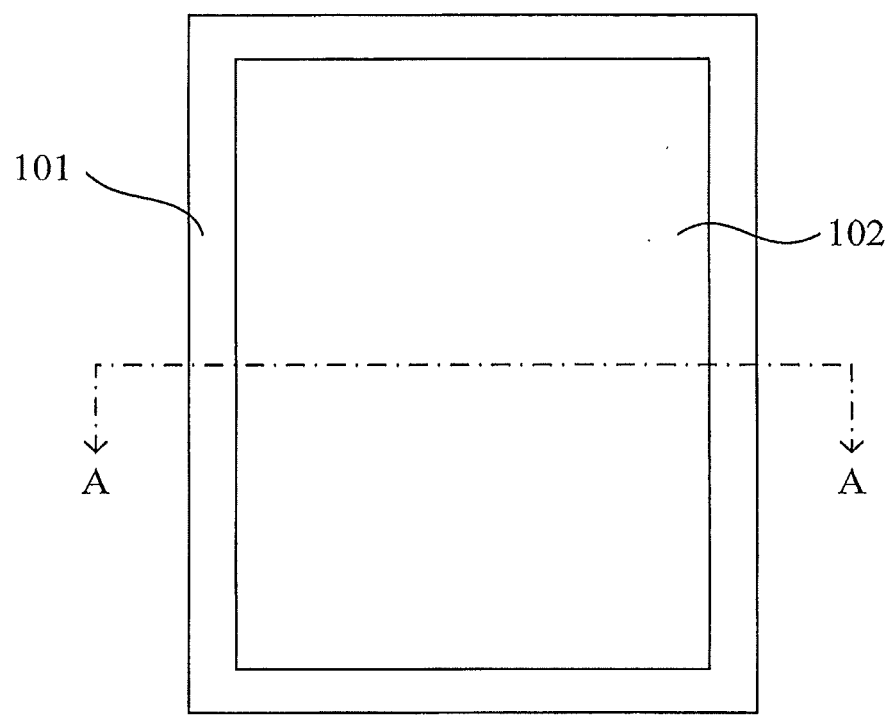
FIG. 3 is an external view of a touch panel 100 according to a first embodiment.
Figure 4:
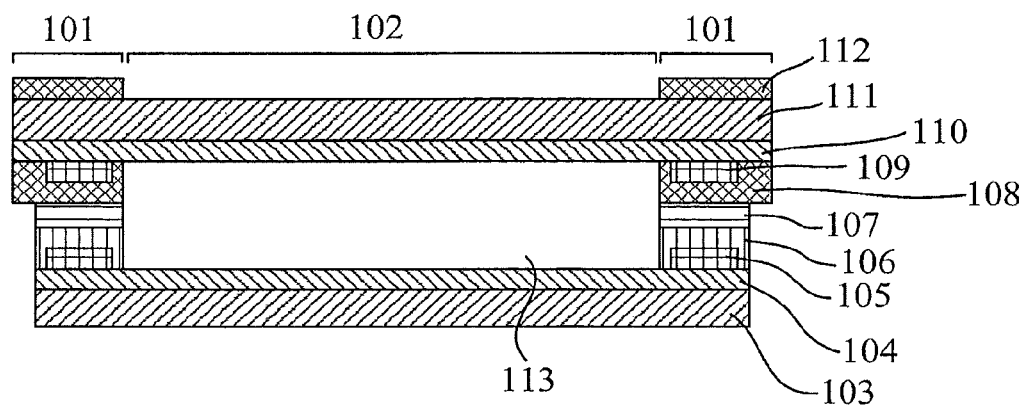
FIG. 4 is a cross-section diagram of the touch panel 100 taken along a line A-A in FIG. 3.

FIG. 3 is an external view of a touch panel 100 according to a first embodiment. FIG. 4 is a cross-section diagram of the touch panel 100 taken along a line A-A in FIG. 3.

The touch panel 100 according to the first embodiment is a resistive film type touch panel, and includes an opaque decoration area 101 on an outer circumference of the touch panel 100 and a transparent operation area 102 in the center of the touch panel 100. The operation area 102 is an area accepting an input operation by a finger, a pen or the like. The decoration area 101 is a non-operation area that does not accept the input operation by the finger, the pen or the like. Moreover, the decoration area 101 is an area for hiding an electric wiring pattern, an insulating layer, and an adhesion layer described later from the view of an operator. The touch panel 100 is mounted on a mobile phone, a tablet terminal or the like.

As illustrated in FIG. 4, the touch panel 100 includes a lower transparent substrate 103, a lower transparent electrode film 104, an electric wiring pattern 105 (a first electric wiring), an insulating layer 106, an adhesion layer 107, an insulating layer 108, an electric wiring pattern 109 (a second electric wiring), an upper transparent electrode film 110, an upper transparent substrate 111 and a decoration layer 112 in order from the bottom. The lower transparent substrate 103 and the lower transparent electrode film 104 are made of a glass with Indium Tin Oxide (ITO). The lower transparent electrode film 104 is formed on the lower transparent substrate 103 by sputtering, for example.

The electric wiring pattern 105 for connecting an external circuit, not shown, to the lower transparent electrode film 104 is formed on an outer circumference (i.e., the decoration area 101) of the upper surface of the lower transparent electrode film 104. The insulating layer 106 is formed so as to cover an upper surface and side surfaces of the electric wiring pattern 105. Materials with a light shielding effect, such as black carbon-based materials or white titanium oxide-based materials, do not need to be included in the insulating layer 106. The insulating layer 106 may be formed by an insulating paste (i.e., an epoxy-based or an acrylic-based paste) with which the materials with the light shielding effect are blended. The adhesion layer 107 is bonded between the insulating layer 106 and the insulating layer 108. The adhesion layer 107 is an acrylic-based adhesive or an epoxy-based adhesive, but may be a PET (PolyEthylene Terephthalate) film in which double-sided tapes are pasted on the upper and lower surfaces of the PET film.

The insulating layer 108 is formed on the adhesion layer 107 so as to cover the lower surface and the side surfaces of the electric wiring pattern 109. The insulating layer 108 is formed by an insulating paste (i.e., an epoxy-based or an acrylic-based paste) with which the materials with the light shielding effect are blended, such as the black carbon-based materials or the white titanium oxide-based materials.

The electric wiring pattern 109 for connecting an external circuit, not shown, to the upper transparent electrode film 110 is formed on an outer circumference (i.e., the decoration area 101) of the lower surface of the upper transparent electrode film 110. The upper transparent substrate 111 is arranged on the upper transparent electrode film 110. The upper transparent electrode film 110 and the upper transparent substrate 111 are made of the PET film with Indium Tin Oxide (ITO). The upper transparent electrode film 110 is formed on the upper transparent substrate 111 by sputtering, for example. An upper surface of the upper transparent substrate 111 is the operation surface. The decoration layer 112 having a thickness of 10 µm or less is formed on an upper surface of the decoration area 101 of the upper transparent substrate 111. To secure the flatness of a surface, the thickness of the decoration layer 112 is suppressed to 10 µm or less. The decoration layer 112 is formed by ink jet printing, silk printing, or the like. An air gap 113 is formed in the operation area 102 between the upper transparent electrode film 110 and the lower transparent electrode film 104.

Figure 5:
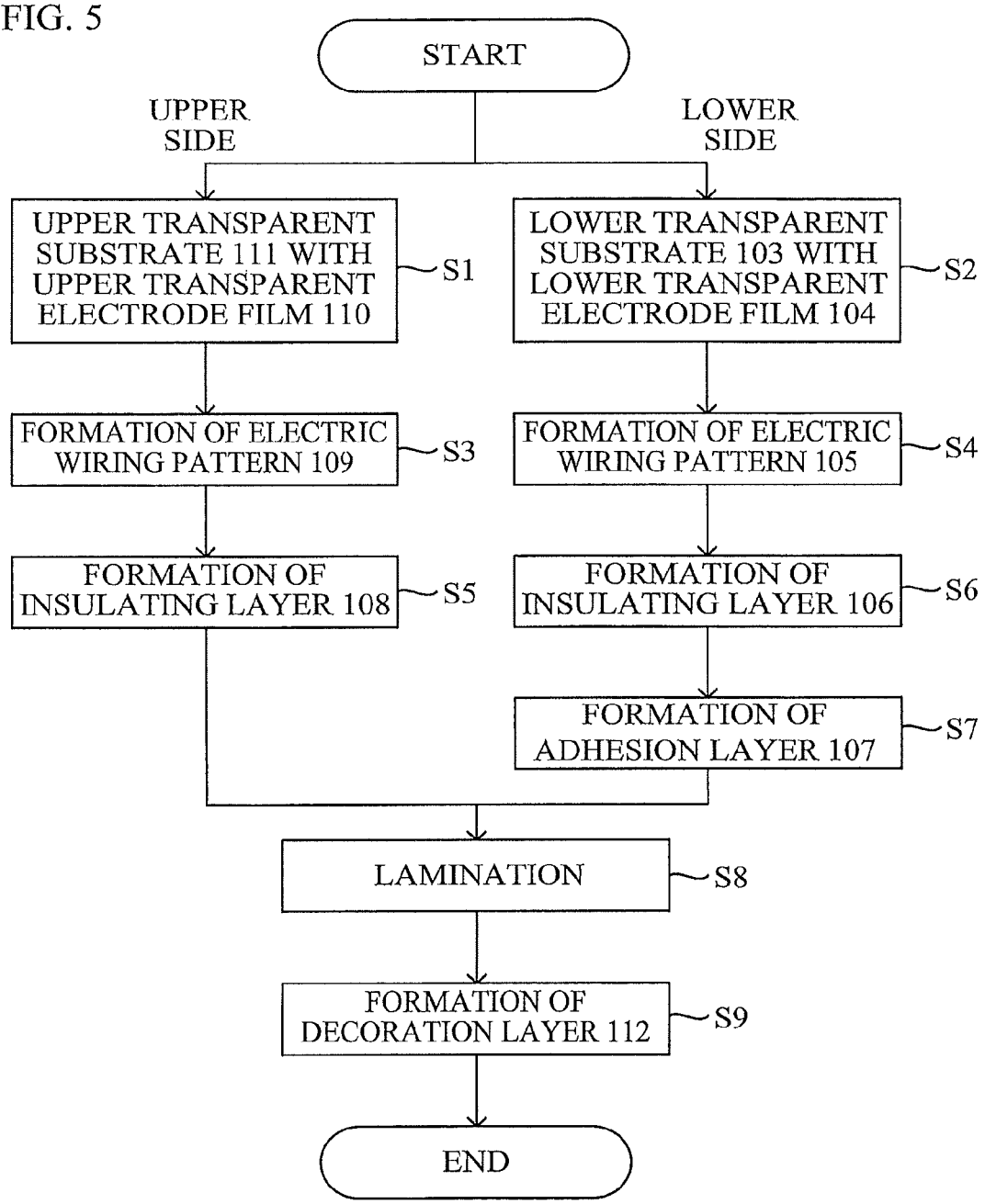
FIG. 5 is a flowchart illustrating a method for manufacturing the touch panel 100.

FIG. 5 is a flowchart illustrating a method for manufacturing the touch panel 100. A well-known device is used as a manufacturing device for the touch panel 100.

First, the upper transparent substrate 111 with the upper transparent electrode film 110 is prepared (step S1). The lower transparent substrate 103 with the lower transparent electrode film 104 is prepared (step S2). At this time, the upper transparent substrate 111 is arranged so that the upper transparent electrode film 110 is placed on the upper transparent substrate 111. The lower transparent substrate 103 is arranged so that the lower transparent electrode film 104 is placed on the lower transparent substrate 103.

Then, the electric wiring pattern 109 is formed on the outer circumference (i.e., the decoration area 101) of the upper transparent electrode film 110 (step S3). The electric wiring pattern 109 is formed by pattern-printing, for example, a silver paste on the outer circumference of the upper transparent electrode film 110. Moreover, the electric wiring pattern 105 is formed on the outer circumference (i.e., the decoration area 101) of the lower transparent electrode film 104 (step S4). The electric wiring pattern 105 is formed by pattern-printing, for example, a silver paste on the outer circumference of the lower transparent electrode film 104. Then, the insulating layer 108 is formed so as to cover the lower surface (i.e., a bottom surface of the electric wiring pattern 109 of FIG. 4) and the side surfaces of the electric wiring pattern 109 (step S5). The insulating layer 106 is formed so as to cover the upper surface and the side surfaces of the electric wiring pattern 105 (step S6). The insulating layers 106 and 108 are formed by printing, for example, the insulating paste on the electric wiring patterns 105 and 109, respectively.

Then, the adhesion layer 107 is formed on the insulating layer 106 (step S7). The adhesion layer 107 is formed by applying an acrylic-based or epoxy-based adhesive on the insulating layer 106 or pasting the PET film on the insulating layer 106 with the double-sided tape. Here, the adhesion layer 107 also has an insulation property. The upper transparent substrate 111 on which the insulating layer 108, the electric wiring pattern 109 and the upper transparent electrode film 110 are formed is turned upside down, and the insulating layer 108 is laminated on the adhesion layer 107 (step S8). Finally, the decoration layer 112 is formed on the outer circumference of the upper transparent substrate 111 by ink jet printing, silk printing, or the like (step S9). By the processes of steps S1 to S9, the touch panel 100 of FIG. 4 is formed.

In the touch panel 100 of FIG. 4, the decoration layer 112 is formed in a frame shape on the outside of the operation area 102 and a new film and a new layer are not formed on the operation area 102, so that a load for input does not increase. Moreover, since the decoration layer 112 is formed on the upper transparent substrate 111, the decoration layer 112 can be formed so as to completely cover the electric wiring patterns 105 and 109 in a top view. Therefore, the electric wiring patterns 105 and 109 do not protrude to the operation area 102 and are not seen from above.

Moreover, the touch panel having a slight step and high flatness can be achieved by reducing the thickness of the decoration layer 112, i.e., making the thickness of the decoration layer 112 into 10 μm or less. However, when the thickness of the decoration layer 112 is reduced, a color of the decoration layer 112 becomes light, and there is a possibility that the electric wiring pattern 109 is seen from above. As this countermeasure, the insulating layer 108 with the light shielding effect is formed between the adhesion layer 107, and the electric wiring pattern 109 and the upper transparent electrode film 110, and prevents transparency of the decoration layer 112.

With respect to the formation of the insulating layer with the light shielding effect, after the electric wiring pattern 109 is formed on the upper transparent electrode film 110, the insulating layer 108 with the light shielding effect is only formed thereon. Since the process for forming the insulating layer is also performed in processes for manufacturing a general touch panel, the process for forming the insulating layer can be achieved without adding a new complicated manufacturing process.

Second Embodiment

A touch panel 100A according to a second embodiment is a resistive film type touch panel, as with the touch panel 100 according to the first embodiment. The touch panel 100A includes the opaque decoration area 101 on the outer circumference of the touch panel 100A and the transparent operation area 102 in the center of the touch panel 100A. Hereinafter, elements of the touch panel 100A which are same as those of the touch panel 100 are denoted by the same reference numerals, and a description thereof is omitted.

Figure 6:
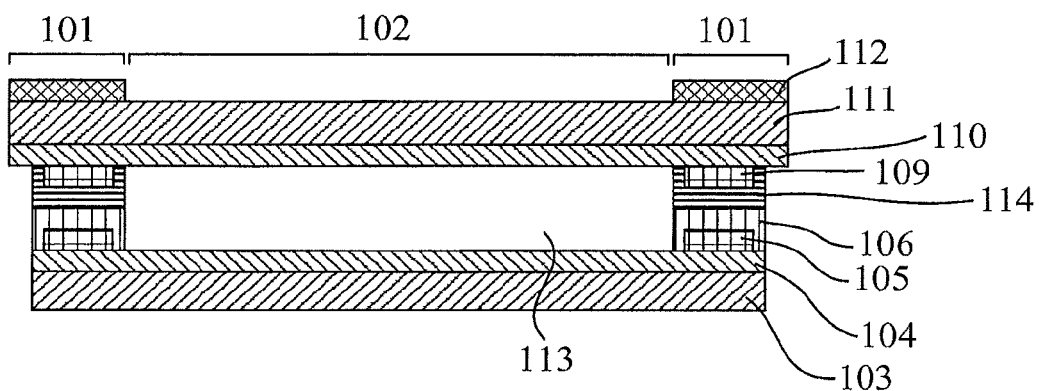
FIG. 6 is a cross-section diagram of a touch panel 100A according to a second embodiment.

FIG. 6 is a cross-section diagram of the touch panel 100A according to the second embodiment.

In the touch panel 100A, an adhesion layer 114 is provided as substitute for the adhesion layer 107 and the insulating layer 108 of the touch panel 100 of FIG. 4. The adhesion layer 114 is formed so as to cover the lower surface and the side surfaces of the electric wiring pattern 109, and bonds the electric wiring pattern 109 and the upper transparent electrode film 110 to the insulating layer 106. The adhesion layer 114 is an acrylic-based adhesive or an epoxy-based adhesive which has a light shielding effect, such as white or black. Alternatively, the adhesion layer 114 may be a PET film in which double-sided tapes are pasted on the upper and lower surfaces of the PET film, for example. In this case, the PET film has a colored light shielding effect, such as the white or the black. The other elements of the touch panel 100A are the same as corresponding elements of the touch panel 100 of FIG. 4.

Figure 7:
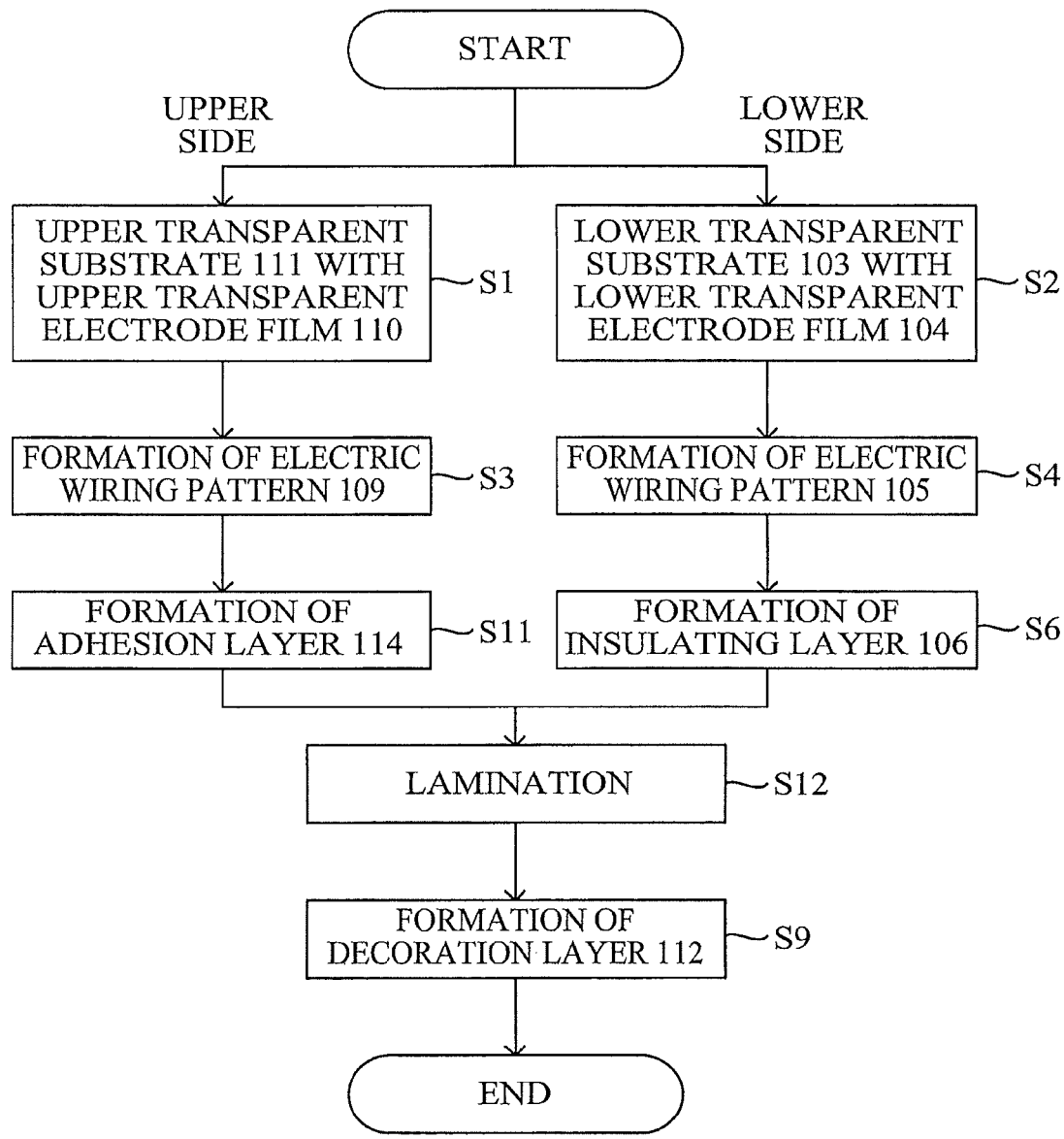
FIG. 7 is a flowchart illustrating a method for manufacturing the touch panel 100A.

FIG. 7 is a flowchart illustrating a method for manufacturing the touch panel 100A. The well-known device is used as a manufacturing device for the touch panel 100A. Here, a description of processes which are same as the method for manufacturing the touch panel 100 of FIG. 5 is omitted.

First, as with the method for manufacturing the touch panel 100 of FIG. 5, the processes of steps S1 to S4 are performed. Then, the adhesion layer 114 is formed so as to cover the lower surface (i.e. the bottom surface of the electric wiring pattern 109 of FIG. 6) and the side surfaces of the electric wiring pattern 109 (step S11). The adhesion layer 114 is formed by applying the acrylic-based or epoxy-based adhesive on the electric wiring pattern 109 or pasting the PET film on the electric wiring pattern 109 with the double-sided tape. The insulating layer 106 is formed so as to cover the upper surface and the side surfaces of the electric wiring pattern 105 (step S6).

The upper transparent substrate 111 to which the adhesion layer 114, the electric wiring pattern 109 and the upper transparent electrode film 110 are fixed is turned upside down, and the adhesion layer 114 is laminated on the insulating layer 106 (step S12). Finally, the decoration layer 112 is formed on the outer circumference of the upper transparent substrate 111 by ink jet printing, silk printing, or the like (step S9). By the above-mentioned processes, the touch panel 100A of FIG. 6 is formed.

The materials of the adhesion layer are only changed to the materials with the light shielding effect without forming the insulating layer 108, compared with the method for manufacturing the touch panel 100 of FIG. 5, and hence the touch panel 100A can be easily manufactured without adding complicated manufacturing processes.

In the touch panel 100A, the adhesion layer 114 has the light shielding effect unlike the touch panel 100. Since the decoration layer 112 of the touch panel 100A is the same as that of the touch panel 100, the touch panel in which the load for input does not increase and which has a slight step and high flatness can be achieved. Since the decoration layer 112 can be formed so as to completely cover the electric wiring patterns 105 and 109 in a top view, the electric wiring patterns 105 and 109 do not protrude to the operation area 102 and are not seen from above. One insulating layer is reduced, compared with the touch panel 100, and therefore the thickness of the touch panel 100A can be reduced.

Third Embodiment

A touch panel 100B according to a third embodiment is a resistive film type touch panel, as with the touch panels 100 and 100A. The touch panel 100B includes the opaque decoration area 101 on the outer circumference of the touch panel 100B and the transparent operation area 102 in the center of the touch panel 100B. Hereinafter, elements of the touch panel 100B which are same as those of the touch panels 100 and 100A are denoted by the same reference numerals, and a description thereof is omitted.

Figure 8:
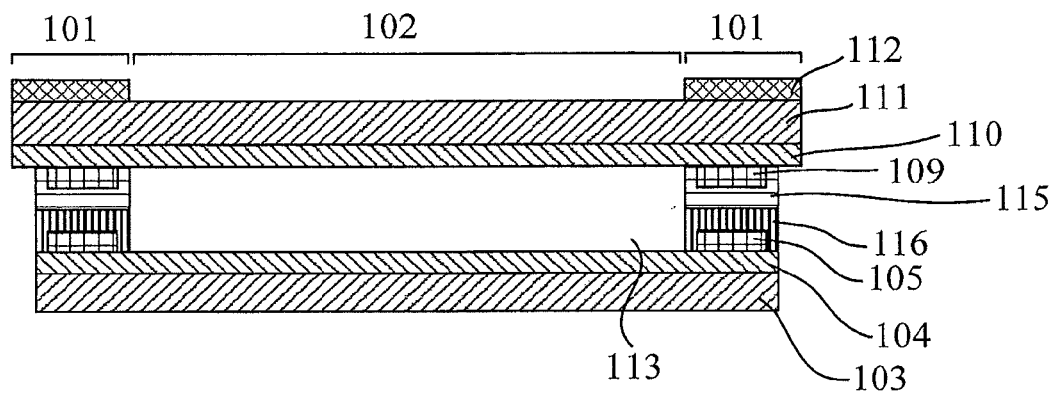
FIG. 8 is a cross-section diagram of a touch panel 100B according to a third embodiment.

FIG. 8 is a cross-section diagram of the touch panel 100B according to the third embodiment.

In the touch panel 100B, an adhesion layer 115 is provided as substitute for the adhesion layer 114 of the touch panel 100A of FIG. 6, and an insulating layer 116 is provided as substitute for the insulating layer 106 of the touch panel 100A of FIG. 6. The adhesion layer 115 is formed so as to cover the lower surface and the side surfaces of the electric wiring pattern 109, and bonds the electric wiring pattern 109 and the upper transparent electrode film 110 to the insulating layer 116. The adhesion layer 115 is an acrylic-based adhesive or an epoxy-based adhesive, for example, but does not have the light shielding effect. Alternatively, the adhesion layer 115 may be the PET film in which double-sided tapes are pasted on the upper and lower surfaces of the PET film, for example.

The insulating layer 116 is formed so as to cover the upper surface and the side surfaces of the electric wiring pattern 105. The insulating layer 116 is formed by an insulating paste (i.e., an epoxy-based or an acrylic-based paste) with which the materials with the light shielding effect are blended, such as the black carbon-based materials or the white titanium oxide-based materials. The other elements of the touch panel 100B are the same as corresponding elements of the touch panel 100A of FIG. 6.

In the touch panel 100A of FIG. 6, the insulating layer 106 does not have the light shielding effect, but the adhesion layer 114 has the light shielding effect. On the contrary, in the touch panel 100B, the adhesion layer 115 does not have the light shielding effect, but the insulating layer 116 has the light shielding effect.

Figure 9:
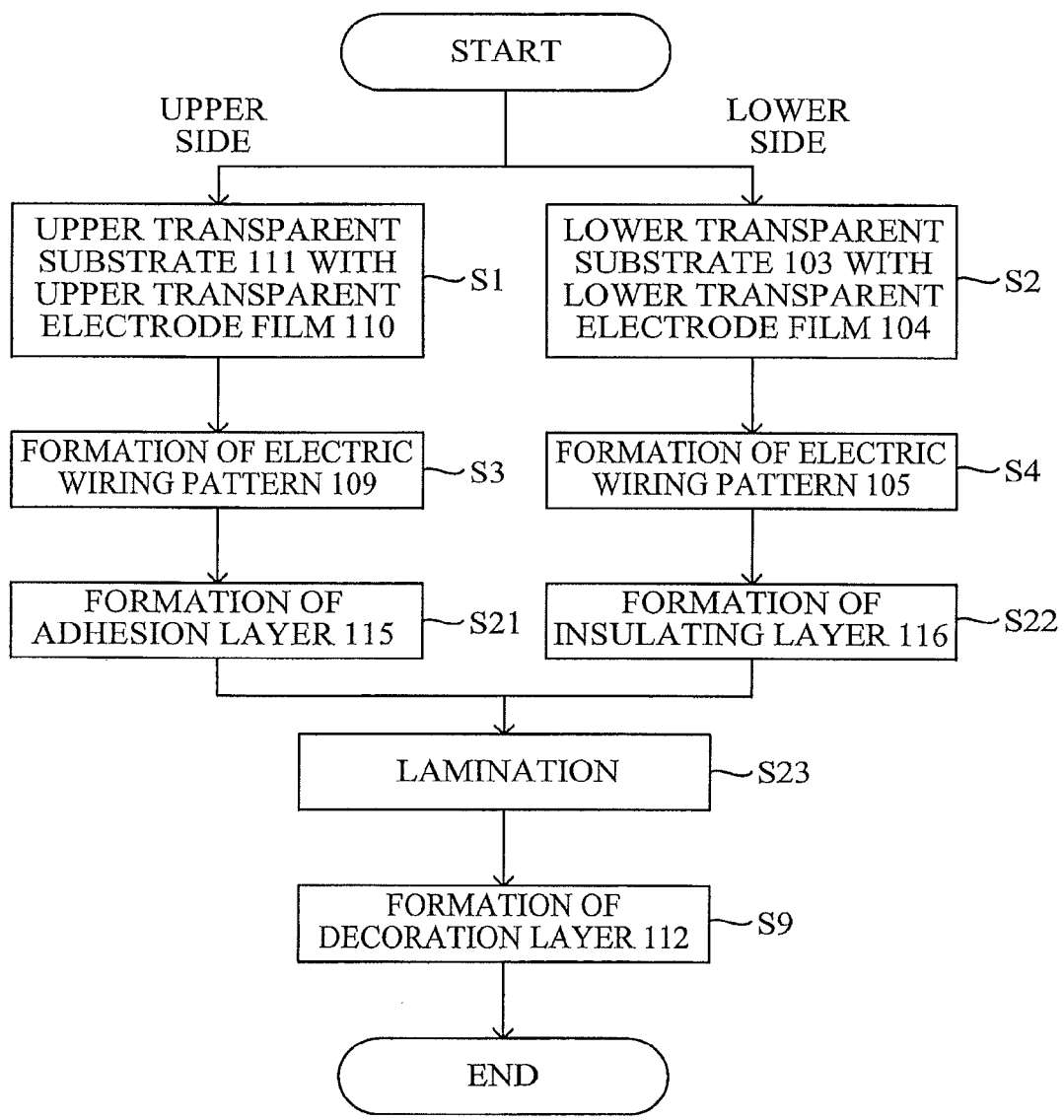
FIG. 9 is a flowchart illustrating a method for manufacturing the touch panel 100B.

FIG. 9 is a flowchart illustrating a method for manufacturing the touch panel 100B. The well-known device is used as a manufacturing device for the touch panel 100B. Here, a description of processes which are the same as the method for manufacturing the touch panel 100 of FIG. 5 is omitted.

First, as with the method for manufacturing the touch panel 100 of FIG. 5, the processes of steps S1 to S4 are performed. Then, the adhesion layer 115 is formed so as to cover the lower surface (i.e. the bottom surface of the electric wiring pattern 109 of FIG. 8) and the side surfaces of the electric wiring pattern 109 (step S21). The adhesion layer 115 is formed by applying the acrylic-based or epoxy-based adhesive on the electric wiring pattern 109 or pasting the PET film on the electric wiring pattern 109 with the double-sided tape. The insulating layer 116 is formed so as to cover the upper surface and the side surfaces of the electric wiring pattern 105 (step S22). The insulating layer 116 is formed by printing the insulating paste on the electric wiring pattern 105, for example.

Then, the upper transparent substrate 111 to which the adhesion layer 115, the electric wiring pattern 109 and the upper transparent electrode film 110 are fixed is turned upside down, and the adhesion layer 115 is laminated on the insulating layer 116 (step S23). Finally, the decoration layer 112 is formed on the outer circumference of the upper transparent substrate 111 by ink jet printing, silk printing, or the like (step S9). By the above-mentioned processes, the touch panel 100B of FIG. 8 is formed.

The materials of the insulating layer are only changed to the materials with no light shielding effect, and the materials of the adhesion layer are only changed to the materials with the light shielding effect, compared with the method for manufacturing the touch panel 100A of FIG. 7. Therefore, the touch panel 100B can be easily manufactured without adding complicated manufacturing processes.

In the touch panel 100B, the insulating layer 116 has the light shielding effect unlike the touch panels 100 and 100A. Since the decoration layer 112 of the touch panel 100B is the same as that of the touch panel 100, the touch panel in which the load for input does not increase and which has a slight step and high flatness can be achieved. Since the decoration layer 112 can be formed so as to completely cover the electric wiring patterns 105 and 109 in a top view, the electric wiring patterns 105 and 109 do not protrude to the operation area 102 and are not seen from above. One insulating layer is reduced, compared with the touch panel 100, and therefore the thickness of the touch panel 100B can be reduced.

Fourth Embodiment

A touch panel 100C according to a fourth embodiment is a resistive film type touch panel, as with the touch panels 100 to 100B. The touch panel 100C includes the opaque decoration area 101 on the outer circumference of the touch panel 100C and the transparent operation area 102 in the center of the touch panel 100C. Hereinafter, elements of the touch panel 100C which are same as those of the touch panels 100 to 100B are denoted by the same reference numerals, and a description thereof is omitted.

Figure 10:
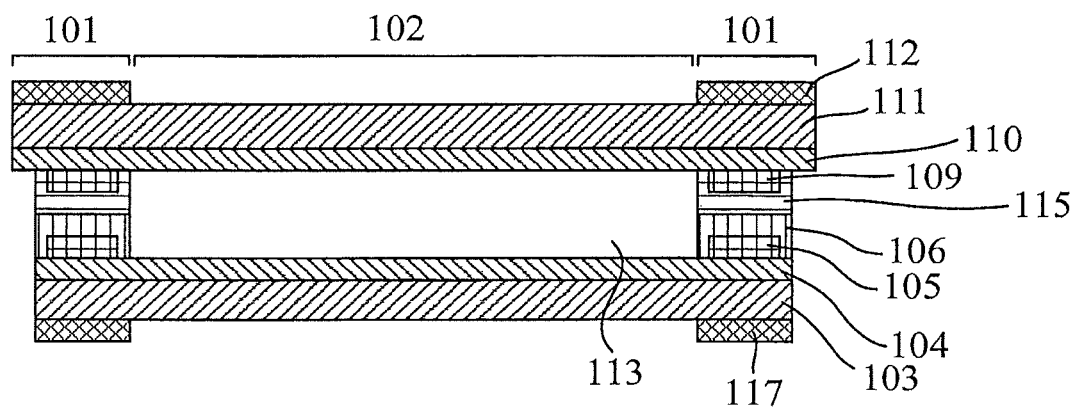
FIG. 10 is a cross-section diagram of a touch panel 100C according to a fourth embodiment.

FIG. 10 is a cross-section diagram of the touch panel 100C according to the fourth embodiment.

In the touch panel 100C, the insulating layer 106 with no light shielding effect of the touch panel 100A of FIG. 6 is provided as substitute for the insulating layer 116 with the light shielding effect of the touch panel 100B of FIG. 8. Moreover, a light shielding member 117 is laminated on the outer circumference (i.e., decoration area 101) of the lower surface of the lower transparent substrate 103. The light shielding member 117 is a colored PET film, a colored urethane-based cushion, or the like, for example.

That is, in the touch panel 100C, the insulating layer 106 and the adhesion layer 115 formed between the upper transparent electrode film 110 and the lower transparent electrode film 104 have no light shielding effect, but the light shielding member 117 secures the light shielding effect. The other elements of the touch panel 100C are same as corresponding elements of the touch panel 100B of FIG. 8.

Figure 11:
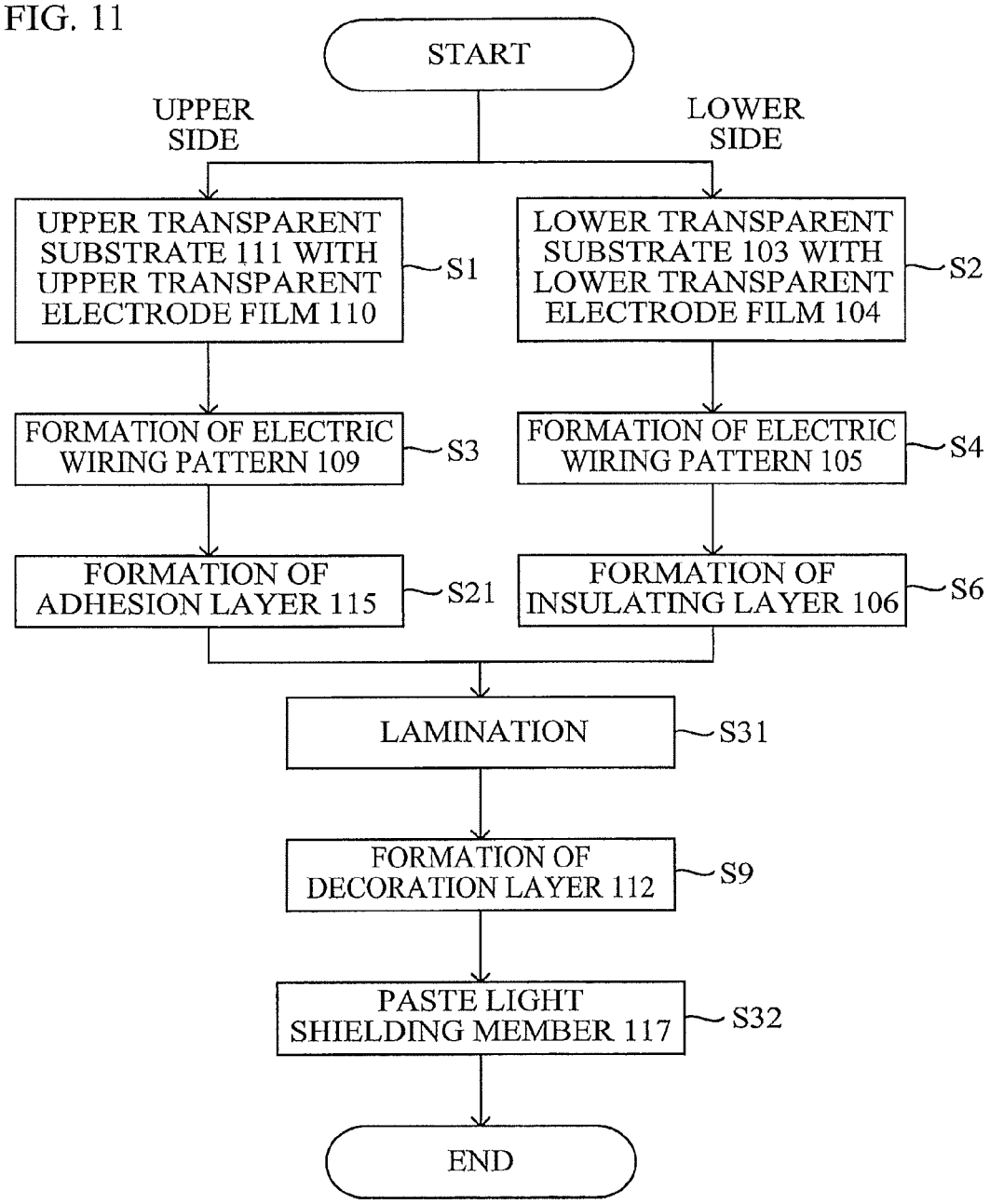
FIG. 11 is a flowchart illustrating a method for manufacturing the touch panel 100C.

FIG. 11 is a flowchart illustrating a method for manufacturing the touch panel 100C. The well-known device is used as a manufacturing device for the touch panel 100C. Here, a description of processes which are same as the methods for manufacturing the touch panel 100 of FIG. 5 and the touch panel 100B of FIG. 9 is omitted.

First, as with the method for manufacturing the touch panel 100 of FIG. 5, the processes of steps S1 to S4 are performed. After step S3, step S21 of FIG. 9 is performed. After step S4, step S6 of FIG. 5 is performed. Then, the upper transparent substrate 111 to which the adhesion layer 115, the electric wiring pattern 109 and the upper transparent electrode film 110 are fixed is turned upside down, and the adhesion layer 115 is laminated on the insulating layer 106 (step S31). After step S31, step S9 of FIG. 5 is performed. Finally, the light shielding member 117 is pasted on the outer circumference (i.e., decoration area 101) of the lower surface of the lower transparent substrate 103 with an adhesive (step S32). By the above-mentioned processes, the touch panel 100C of FIG. 10 is formed.

The materials of the insulating layer are only changed to the materials with no light shielding effect, and the light shielding member 117 is only pasted on the back of the touch panel, compared with the method for manufacturing the touch panel 100B of FIG. 9. Therefore, the touch panel 100C can be easily manufactured without adding complicated manufacturing processes.

In the touch panel 100C, the light shielding member 117 has the light shielding effect unlike the touch panels 100 to 100B. Since the decoration layer 112 of the touch panel 100C is the same as that of the touch panel 100, the touch panel in which the load for input does not increase and which has a slight step and high flatness can be achieved. Since the decoration layer 112 can be formed so as to completely cover the electric wiring patterns 105 and 109 in a top view, the electric wiring patterns 105 and 109 do not protrude to the operation area 102 and are not seen from above. One insulating layer is reduced, compared with the touch panel 100, and therefore the thickness of the touch panel 100C can be reduced.

Fifth Embodiment

A touch panel 100D according to a fifth embodiment is a resistive film type touch panel, as with the touch panels 100 to 100C. The touch panel 100D includes the opaque decoration area 101 on the outer circumference of the touch panel 100C and the transparent operation area 102 in the center of the touch panel 100C. Hereinafter, elements of the touch panel 100D which are same as those of the touch panels 100 to 100C are denoted by the same reference numerals, and a description thereof is omitted.

Figure 12:
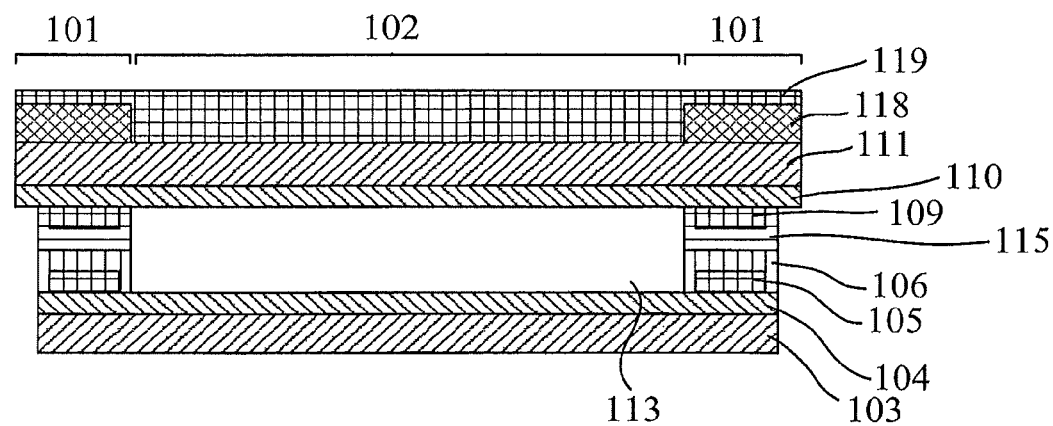
FIG. 12 is a cross-section diagram of a touch panel 100D according to a fifth embodiment.

FIG. 12 is a cross-section diagram of the touch panel 100D according to the fifth embodiment.

A decoration layer 118 having a thickness of 10 μm or more and 40 μm or less is formed on the outer circumference (i.e., decoration area 101) of the upper surface of the upper transparent substrate 111. The decoration layer 118 is thicker than the above-mentioned decoration layer 112, and is formed by ink jet printing, silk printing, or the like. Since the insulating layer 106 and the adhesion layer 115 formed between the upper transparent electrode film 110 and the lower transparent electrode film 104 have no light shielding effect, the decoration layer 118 secures the light shielding effect.

Moreover, in the touch panel 100D, a coating material 119 is applied on the operation area 102 of the upper transparent substrate 111 and the decoration layer 118. This is to make the surface of the touch panel 100D flat. Therefore, the coating material 119 to be applied on the operation area 102 of the upper transparent substrate 111 is thicker than the coating material 119 to be applied on the decoration layer 118. When the thickness of the decoration layer 118 is 20 μm, it is assumed that the thickness of the coating material 119 to be applied on the operation area 102 of the upper transparent substrate 111 is 30 μm, and the thickness of the coating material 119 to be applied on the decoration layer 118 is 10 μm. Thereby, a position of the surface of the coating material 119 is held constant, and hence the surface of the touch panel 100D becomes flat. For example, the coating material 119 is an acrylic-based or an epoxy-based hard coating material. A way of the coating is flow, spray, spin coating, roller coating, or the like.

In the touch panel 100D, the coating material 119 is applied on the operation area 102, and hence the load for input increases, compared with the touch panels 100 to 100C.

Figure 1A:
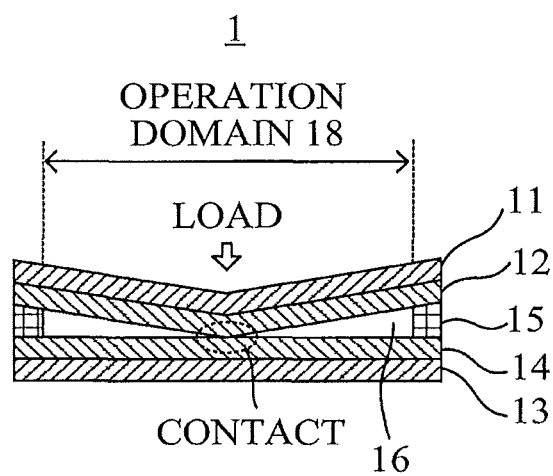
FIG. 1A is a cross-section diagram of a resistive film type touch panel 1 having no decoration film.
Figure 1B:
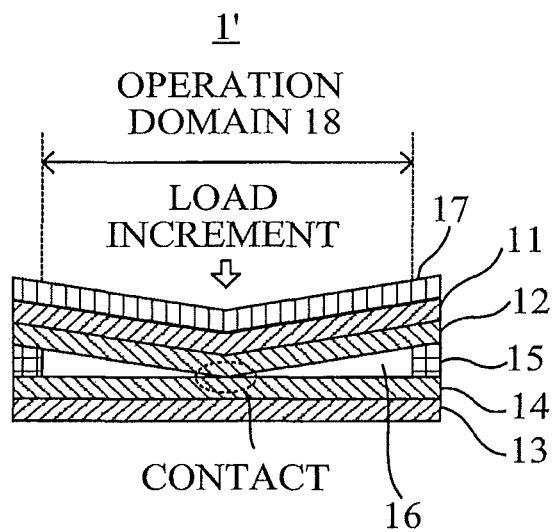
FIG. 1B is a cross-section diagram of a resistive film type touch panel 1' having the decoration film.
Figure 13:
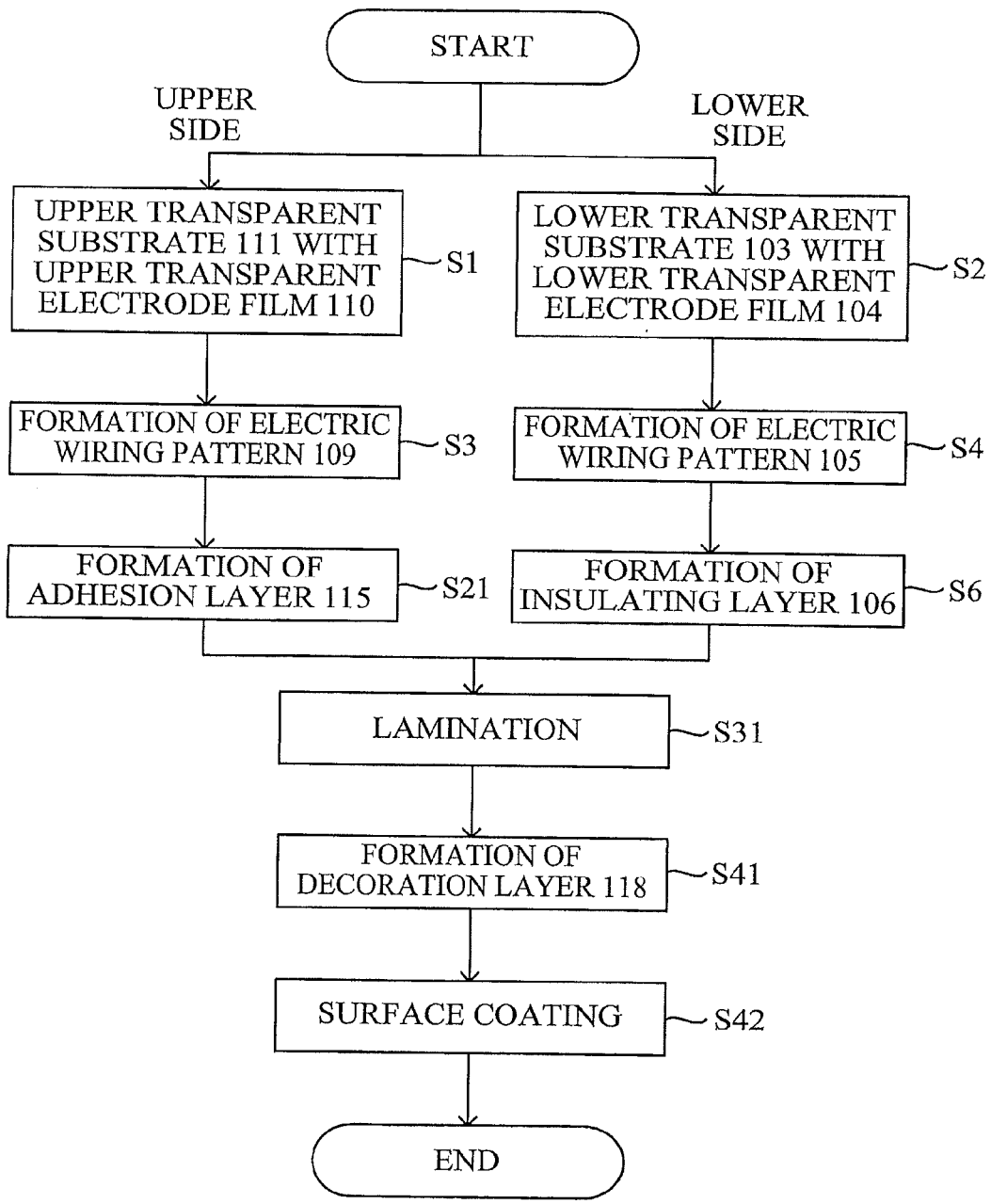
FIG. 13 is a flowchart illustrating a method for manufacturing the touch panel 100D.

Here, it is considered that the decoration film is laminated on the upper transparent substrate, as illustrated in FIG. 1B. In general, the decoration film has a configuration in which the decoration layer and the adhesion layer are laminated on a transparent film which is a substrate. Therefore, when the decoration film is laminated on the upper transparent substrate, the decoration layer, the adhesion layer and the transparent film are laminated on the operation panel of the upper transparent substrate. On the contrary, in the touch panel 100D, only the coating material 119 is applied on the operation area 102 of the upper transparent substrate 111, and hence the load for input can be reduced by adjusting the component and the thickness of the coating material 119, compared with the case of the decoration film FIG. 13 is a flowchart illustrating a method for manufacturing the touch panel 100D. The well-known device is used as a manufacturing device for the touch panel 100D. Here, a description of processes which are same as the methods for manufacturing the touch panel 100 of FIG. 5, the touch panel 100B of FIG. 9 and the touch panel 100C of FIG. 11 is omitted.

First, as with the method for manufacturing the touch panel 100 of FIG. 5, the processes of steps S1 to S4 are performed. After step S3, step S21 of FIG. 9 is performed. After step S4, step S6 of FIG. 5 is performed. After steps S21 and S6, step S31 of FIG. 11 is performed. Then, the decoration layer 118 is formed on the outer circumference of the upper transparent substrate 111 by ink jet printing, silk printing, or the like (step S41). The coating material 119 is applied on the operation area 102 of the upper transparent substrate 111 and the decoration layer 118 (step S42). By the above-mentioned processes, the touch panel 100D of FIG. 12 is formed.

Compared with the method for manufacturing the touch panel 100C of FIG. 11, the decoration layer is made thick and the coating of the surface of the touch panel is performed as substitute for laminating the light shielding member 117. Therefore, the touch panel 100D can be easily manufactured without adding complicated manufacturing processes.

Here, in the first to fifth embodiments, a single member has the light shielding effect, but a plurality of members may have the light shielding effect. For example, both of the insulating layer and the adhesion layer may have the light shielding effect.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A touch panel comprising:
   an upper transparent substrate having an upper transparent electrode film;
   a lower transparent substrate having a lower transparent electrode film;
   a first electric wiring formed on the upper transparent electrode film;
   a second electric wiring formed on the lower transparent electrode film;

an insulator formed between the first electric wiring and the second electric wiring, the insulator being made of a material with a light shielding effect; and a decoration layer with a light shielding effect formed on the upper transparent substrate so as to cover the first electric wiring, the second electric wiring and the insulator.

2. The touch panel as claimed in claim 1, wherein the insulator includes an insulating layer, and an adhesion layer bonds the upper transparent substrate and the lower transparent substrate, and at least one of the insulating layer and the adhesion layer is made of a material with a light shielding effect.

3. A touch panel comprising:

an upper transparent substrate having an upper transparent electrode film;

a lower transparent substrate having a lower transparent electrode film;

a first electric wiring formed on the upper transparent electrode film;

a second electric wiring formed on the lower transparent electrode film;

an insulating layer formed between the first electric wiring and the second electric wiring;

a decoration layer with a light shielding effect formed on the upper transparent substrate so as to cover the first electric wiring, the second electric wiring and the insulating layer; and a light shielding member provided on a lower surface of the lower transparent substrate so as to overlap with the decoration layer.

4. A touch panel comprising:

an upper transparent substrate having an upper transparent electrode film;

a lower transparent substrate having a lower transparent electrode film, wherein the upper and lower transparent electrodes have first surfaces that face each other;

a first electric wiring having a first surface formed on the first surface of the upper transparent electrode film;

a second electric wiring having a first surface formed on the first surface of the lower transparent electrode film;

an insulator formed between the first electric wiring and the second electric wiring, the insulator being made of a material with a light shielding effect and covering the remaining surfaces of the first and second electric wirings; and a decoration layer formed on the upper transparent substrate, opposite the upper transparent electrode film, so as to cover the first electric wiring, the second electric wiring and the insulator.

* * * * *